Dec. 9, 1958 W. R. AIKEN 2,864,033
POLAR COORDINATE TUBE
Filed March 18, 1955 4 Sheets-Sheet 1

INVENTOR.
WILLIAM R. AIKEN
BY James E. Toomey
ATTORNEY

Dec. 9, 1958
W. R. AIKEN
2,864,033
POLAR COORDINATE TUBE
Filed March 18, 1955
4 Sheets-Sheet 2
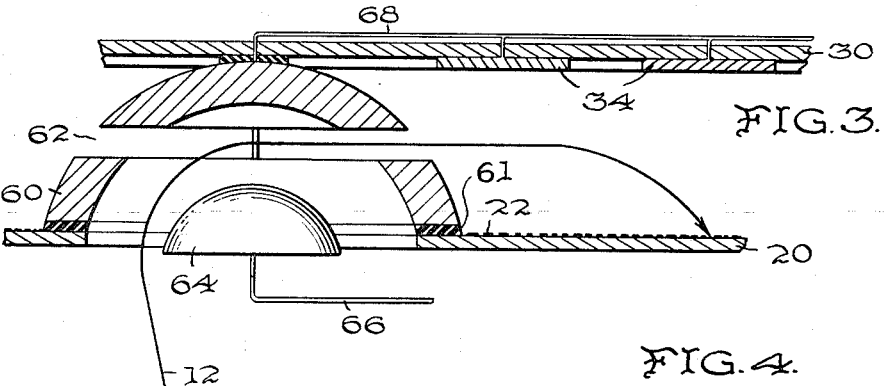
FIG. 3.
FIG. 4.
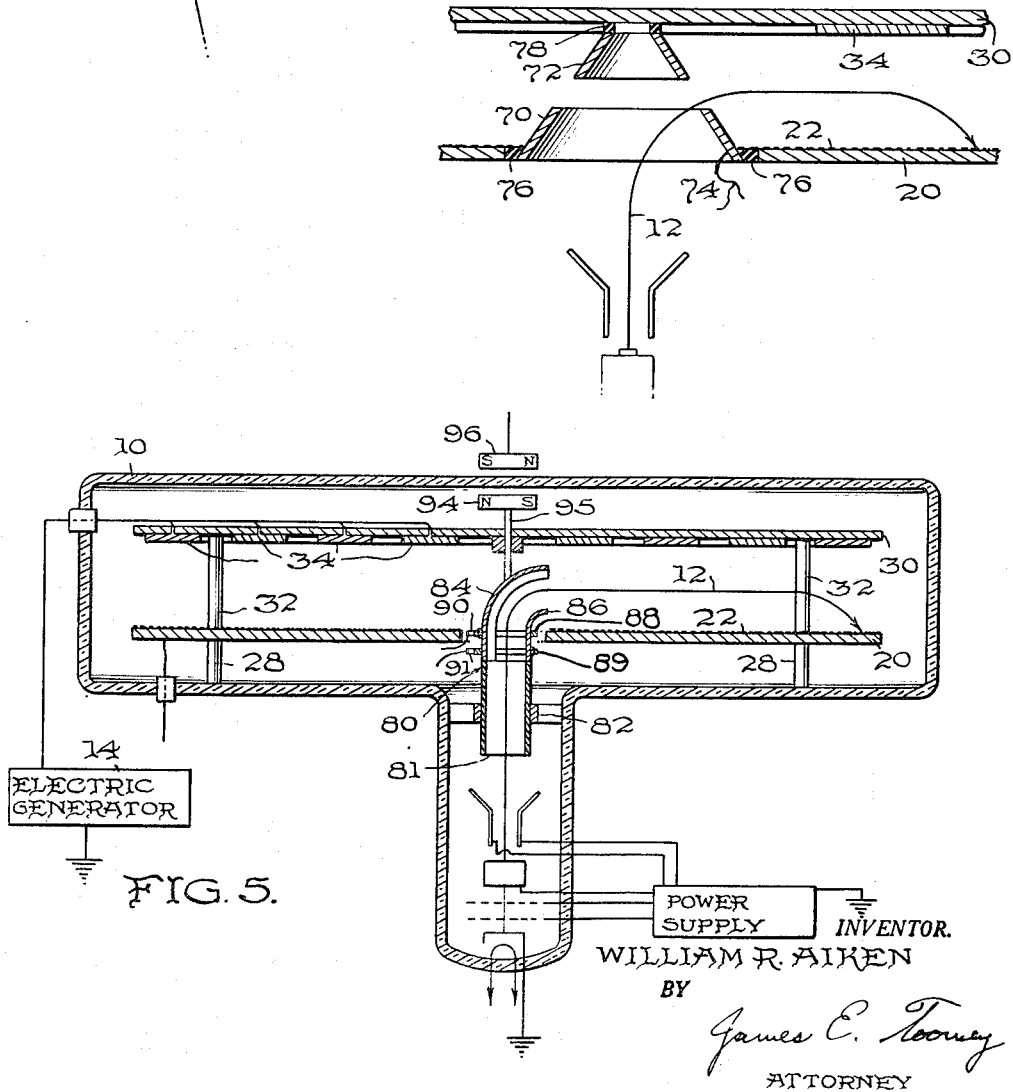
FIG. 5.
INVENTOR.
WILLIAM R. AIKEN
BY
James E. Toomey
ATTORNEY Dec. 9, 1958 W. R. AIKEN 2,864,033
POLAR COORDINATE TUBE
Filed March 18, 1955 4 Sheets-Sheet 3
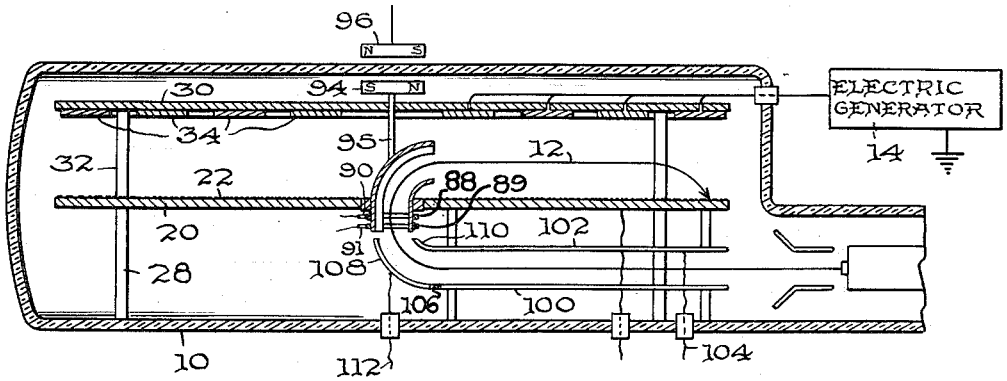
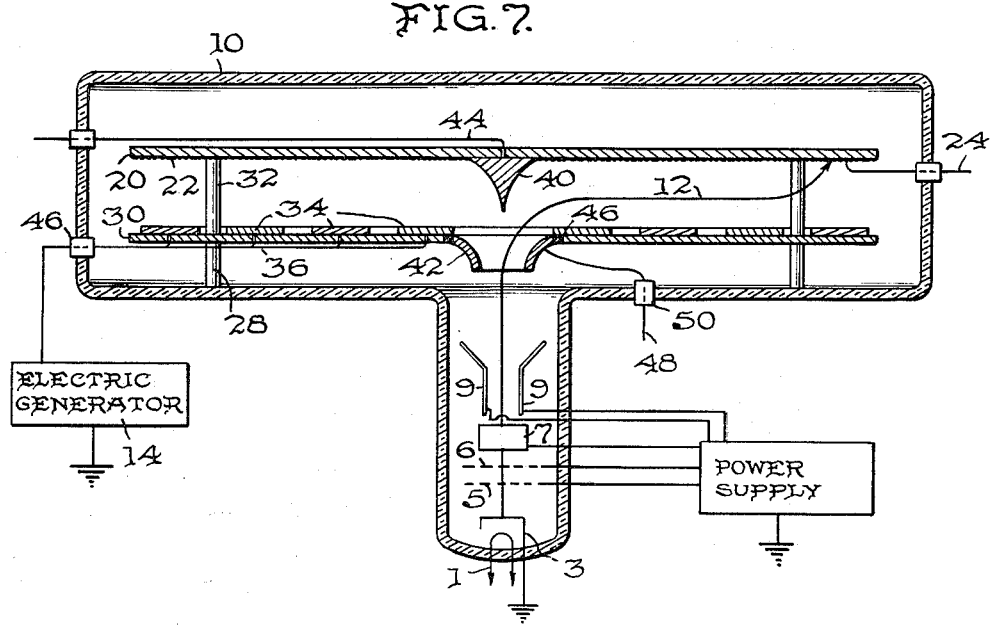
INVENTOR.
WILLIAM R. AIKEN
BY
James E. Toomey
ATTORNEY

United States Patent Office 2,864,033
Patented Dec. 9, 1958

2,864,033

POLAR COORDINATE TUBE

William R. Aiken, Los Altos, Calif., assignor, by mesne assignments, to Kaiser Industries Corporation, a corporation of Nevada Application March 18, 1955, Serial No. 495,316

22 Claims. (Cl. 315—21)

This invention relates to a cathode ray tube and more particularly to a polar coordinate cathode ray tube structure.

A polar coordinate type cathode ray tube structure as known in the art has particular application in its use as a so-called memory or storage tube. In such use the tube is primarily adapted to store a clear, distinct image from one scan to another, whereby it is possible to simultaneously visually compare several sets of signals on the target. Storage tubes have been particularly successful in their use in electronic navigational aids for pilots (aircraft cockpit weather mapping), television film conversion, radar scan conversion, digital and analog computers, moving target indication radar and bandwidth reduction.

Many of these applications require a tube which is of a small, compact structure. A particular example of such problem is evidenced in the utilization of such type tube in the provision of electronic navigational aids for aircraft use. That is, among the ever present problems in the present high speed aircraft is the accommodation of the necessary navigational equipment components. Present aircraft design is dictated by the physics of aerodynamics which demands exceedingly smaller cross-sectional contours in order to obtain the required streamlining for decreasing the wind resistance or drag, thereby increasing the potential velocity of the aircraft. Manifestly, the decrease in cross-sectional dimensions of the aircraft has necessitated that the equipment for operating and navigating aircraft be of correspondingly decreased dimensions.

The conventional cathode ray tube used in navigational equipment has presented a rather insurmountable problem in that in order to reduce the longitudinal dimension of the tube, a corresponding reduction must be made in the diameter of the fluorescent viewing area. Attempts have been made in the prior art to decrease the length of the dimension from the electron gun to the fluorescent image screen in an effort to decrease the overall space requirements of the conventional cathode ray tubes. However, the problems presented thereby involve the fact that in decreasing this dimension it became necessary to curve the image screen so that the length of travel of the electrons from their source to the various portions of the screen would be substantially equal throughout the entire scanning operation in order to present an undistorted image on the screen. If a very large screen were required, it would have to be curved a considerable amount, thereby resulting in a tube shape of awkward and cumbersome configuration.

With the knowledge of these disadvantages, the inventor has provided a polar coordinate cathode ray tube which will satisfactorily overcome these disadvantages and provide an extremely well focused image on a fluorescent screen having considerably less or decreased overall dimensions.

It is the purpose of the invention to produce an electron discharge device comprising a target electrode; a deflection set is disposed in spaced relation from the target electrode; means are provided to deliver an electron beam along a path in a direction toward the target; and means are provided for bending the beam into the space between the deflection set and the target electrode.

The preferred embodiment of the invention as described hereinbelow is concerned with a polar coordinate cathode ray tube which comprises an evacuated envelope and an electron gun arrangement disposed therewithin which is arranged to form a beam of electrons along a path. A target electrode is positioned transversely of the beam path. An electrostatic means is provided intermediate the electron gun and the target electrode capable of effecting a rotation of the electron beam about its longitudinal axis. Beyond the target electrode and between the target electrode and the observer is a plurality of transparent deflecting electrodes. These electrodes are concentric and of varying radii and disposed in a plane parallel to the plane of the target electrode. In the region of the target electrode, an electrostatic field is provided effecting a bend through 90° of the beam of electrons causing the electrons to travel a path intermediate the target electrode and the plurality of transparent deflection electrodes. One surface of the target electrode facing the deflection plates is coated with a phosphor coating so that the electron beam which is successively or sequentially deflected by the deflecting electrodes will impinge the phosphor coating to produce a luminescence.

The novel features which are believed to be characteristic of the invention are recited with particularity in the appended claims. A complete understanding of the invention will be manifested by reference to the following description taken in connection with the accompanying drawings, in which:

Fig. 3 is an enlarged view of a modification of the electrostatic field establishing electrode structure for bending the electron beam;

Fig. 4 is an enlarged view of a modification of an electrostatic field establishing electrode structure for bending the electron beam;

Fig. 5 is a sectional view of a modification of the tube showing an electrostatic field establishing means for simultaneously rotating and bending the electron beam;

Fig. 6 is a sectional view of a modified version of the polar coordinate tube wherein the electron beam is caused to rotate through 360° and further is caused to bend through substantially 270°;

Fig. 7 is a diagrammatic illustration of the polar coordinate tube wherein the deflection electrodes are disposed on a surface which is intermediate the target and the electron gun;

Figure 1:
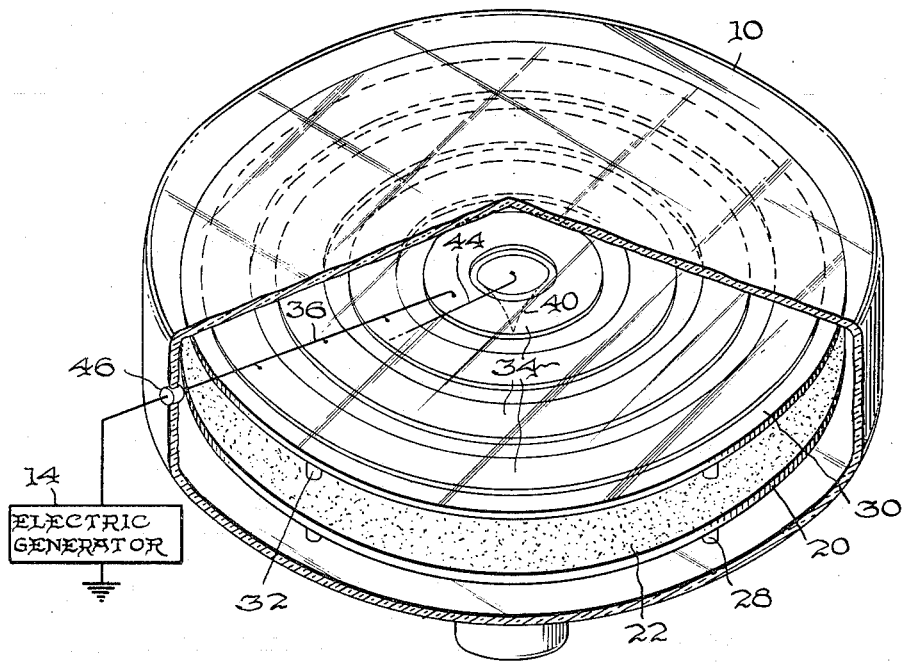
Fig. 1 is a perspective view of the polar coordinate tube partially broken away.
Figure 2:
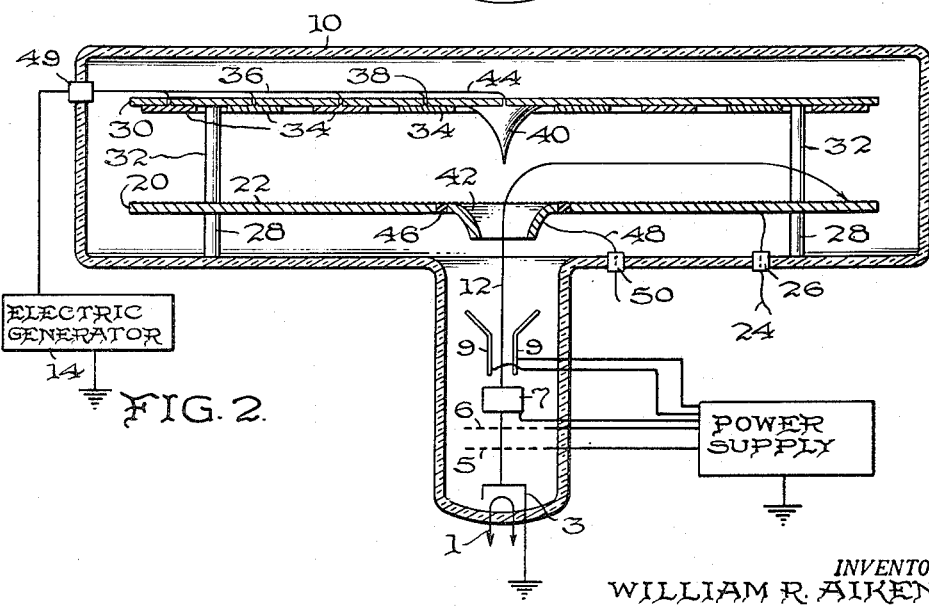
Fig. 2 is a sectional view of the tube showing the various electrical connections schematically.

Referring to Figs. 1 and 2, disposed within an evacuated envelope 10, are arranged a heater or filament 1, a cathode 3, a control electrode 5, an accelerating electrode 6, a pair of horizontal deflecting plates 7, and a pair of vertical deflection plates 9 which comprise a conventional electron gun arrangement or structure for producing an electron beam along a substantially linear path. The components of the electron gun are suitably energized from a power supply situated outside the envelope 10.

In the normal operation of the device, the control electrode 5 is operated at some potential negative with respect to cathode 3, while electrode 6 is maintained at a positive potential of several hundred volts relative to the cathode potential. Electrodes 5 and 6 in cooperation with the cathode 3 and the filament or heater 1 consitute an electron gun structure in which the electron emission from the cathode 3 when properly heated by the filament 1 is formed into an immergent stream or beam 12 of electrons. In structures of this type, incoming signals are applied to the control electrode 5 to density modulate the emission from the cathode 3 in accordance with the signals. Electrode 6 produces a positive field for drawing the electron emission from the cathode through an aperture in the control electrode 5. The deflection of the electron beam 12 is readily effected by controlling the applied potential across the horizontal and vertical deflecting plates 7 and 9, respectively.

An apertured target electrode 20 is disposed within the enlarged portion of the tube 10 and positioned transversely with respect to the immergent electron beam 12. One surface of the target electrode 20 is coated with a fluorescent material 22, such as a phosphor, which will exhibit luminescence when excited by an impinging beam of electrons. A suitable positive potential is applied to the target electrode 20 through an electrical conductor 24. Vacuum is maintained within the tube 10 by providing a seal tight cap 26 through which the electrical conductor 24 may pass. At least three insulating supporting rods 28 are provided in order to suitably support the target electrode 20 within the envelope. One end of each of the supporting rods 28 is suitably affixed to the interior surface of the tube 10 and the other end is affixed to the target electrode 20.

A transparent disc or plate 30 is positioned within the envelope 10 in spaced relation from and parallel to the target electrode 20. The transparent disc 30 is constructed of a material which has non-conductive electrical properties. In order to maintain the spaced relationship between the transparent disc 30 and the target electrode 20, there is provided at least three insulating supporting rods 32, one end of which is secured to the surface of the target electrode which is coated with the fluorescent material and the other end is suitably secured to the surface of the transparent disc 30 facing the target electrode 20.

A plurality of annular transparent electrostatic deflection electrodes 34 are affixed to the surface of the transparent disc 30 adjacent the target electrode 20. Each deflection electrode is coupled to a source of negative going potential supplied by an electric generator 14, such as that described in applicant's co-pending applications Serial Numbers 355,965 and 396,120, through respective strips of transparent electrical conducting material 36, shown in Fig. 1, which are preferably adhered to the surface of the transparent disc 30 and electrically coupled to their respective deflection electrode through minute apertures 38 formed in the transparent disc 30. To effect a deflection or bending of the electron beam 12 as it passes through the apertured target electrode 20, an electrostatic deflection system is provided which comprises a cycloidal conical electrode 40 and a flared annular collar electrode 42. The electrode 40 is attached to the surface of the transparent disc 30 adjacent the target electrode 20 and is maintained at a negative potential with respect to the cathode potential through a strip 44 of transparent conducting material which is preferably adhered to the opposite surface of the transparent disc and thence to a suitable source of negative potential outside the tube 10 through a seal-tight cap 49 which is provided to receive the conducting strip 44 and maintain the vacuum therewithin. The electrode 42 is secured to the target electrode 20 and insulated therefrom by an annular collar 46 formed of a non-conducting material. A positive potential with respect to the cathode potential is supplied to the electrode 42 through a coupling conductor 48. A seal-tight cap 50 is provided to receive the conductor 48 at the point where the conductor enters the tube and forms a sealing relationship between the tube 10 and the conductor 48 in order that the vacuum can be maintained within the evacuated interior of the tube.

The electron beam 12 is directed through a rotating electrostatic field established by the deflection plates 7 and 9 which effects a rotation of the electron beam about its longitudinal axis. The potential applied to the annular electrode 42 is positive and several times greater than the positive potential impressed on the electrode 40, thereby effectively attracting and accelerating electrons toward the aperture formed by the electrode 42. During the normal operation of the device, electrode 40 is maintained at a potential negative with respect to the cathode potential. Thus, the electrons of the beam passing through the electrode 42 and approaching electrode 40 will "see" a negative, deflecting field, which will deflect the beam through substantially 90°. As the beam 12 is deflected, it will be caused to travel in a trajectory intermediate the annular deflecting electrodes 34 and the target electrode 20 and in a substantially parallel relationship therewith. The energy and forward velocity of the beam is sufficient to cause the beam to traverse the entire radius of the target electrode 20 and due to the rotation effected thereon by the rotating electrostatic field it will be caused to rotate or sweep through 360° in a plane parallel that of the target electrode 20. A sequential negative going signal is applied successively to each deflection electrode 34 by the electric generator 14. In operation, as the electrons of the beam 12 reach the peripheral region of the target electrode 20, a negative potential is applied to the outermost annular electrode 34 which thereby establishes a negative field in the peripheral region of the target electrode repelling the beam 12 and thereby causing it to be deflected toward and impinge on the phosphor coating 22 of the target electrode 20. The impinging electrons will cause the phosphor to become excited and luminesce. The resulting luminescence may be then effectively viewed from a point outside the tube 10 through the transparent deflecting electrode 34 and the transparent disc 30.

Assuming that the negative potential applied to the outermost of the deflecting electrodes 34 is maintained, the impinging electrons will exhibit an annulus of luminescence of a constant radius due to the 360° sweep of the beam. However, in actual practice, the potentials applied to the deflection electrodes 34 are successively applied by the electric generator 14 causing the electron beam to be deflected and impinge on radial portions of the target successively away from the center thereof, thereby effecting excitation of the phosphor on substantially every portion of the fluorescent area of the target electrode 20. When complete scanning of the target has been accomplished, the deflection electrodes are recharged by auxiliary means so that the beam may travel once again to the peripheral region of the target and commence another scanning operation. It must be noted that the intensity of the luminescence at any one point where the beam impinges on the fluorescent coating 22 is controlled by the intensity of the incoming signal which is impressed on the control electrode 5. The more negative the signal impressed thereon, the less dense is the resulting beam of electrons, and a corresponding decrease in the amount of luminescence will be exhibited on the fluorescent coating.

Fig. 3 illustrates a modification of the electrostatic deflection system for effecting a substantially 90° deflection of the electron beam and directing its travel along a path intermediate the annular deflecting electrodes 34 and the target electrode 20. The system comprises an inverted semi-spherical electrode 60 having slots or apertures 62 formed therein and a solid semi-spherical electrode 64. Electrode 64 is maintained at a positive potential with respect to the cathode potential through a suitable conductor 66. The conductor 66 is of an electrically conducting material and sufficiently rigid to support the electrode 64 in its desired position with respect to the electrode 60. Electrode 60 is affixed to and insulatingly spaced from the side of the transparent disc 30 adjacent the target electrode 20 and is energized through a transparent conducting strip 68 which is adapted to be disposed on the top surface of the transparent disc 30 and suitably coupled to an external source of potential outside the envelope 10. An insulating ring 61 is provided to insulate the electrode 60 from the target electrode 20. The electrode 60 is maintained at a potential negative with respect to the cathode potential, so that as the electron beam 12 approaches the negative field established in the region of the electrode 60, it will be deflected thereby and be caused to pass through the slit 62 and follow a path intermediate and substantially parallel to the deflection electrodes 34 and the target electrode 20. The beam 12 will thence be reflected by the electrostatic field of the deflection electrodes 34 and thereby caused to impinge on the fluorescent coating 22 in the manner set forth hereinabove.

Fig. 4 illustrates another modification of the electrostatic deflection system for effecting a substantially 90° deflection of the rotating electron beam and directing its travel along a path intermediate the annular deflection electrodes 34 and the target electrode 20. The system comprises a pair of frusto-conical cylindrical electrodes 70 and 72 of different radii. Electrode 70 is maintained at a positive potential which is applied from an external source through an electrical conductor 74. An insulating collar 76 is provided intermediate the target electrode 20 and the electrode 70 to support the electrode 70 as well as to insulatingly separate the electrodes 70 and 20. Electrode 72 is insulatingly mounted on the surface of the transparent disc 30 adjacent the target electrode 20. As shown in Fig. 4, an insulating collar 78 is provided having one of its faces attached to the electrode 72 and the other face attached to the surface of the transparent disc 30, thereby satisfactorily insulating the collar 78 and the disc 30. The electrodes 70 and 72 are spaced from one another in order to allow passage of an electron beam therethrough. Electrode 72 is maintained at a potential negative with respect to the cathode potential, so that as the electron beam 12 approaches the negative field established thereby, it will be deflected and be caused to pass through the space intermediate the electrodes 70 and 72 and will be directed along a path intermediate and substantially parallel to the deflection of electrodes 34 and the target electrode 20. The beam 12 will thence be deflected by the electrostatic field established by the deflection electrodes 34 and thereby impinge on the fluorescent coating 22 in the manner set forth hereinabove.

Fig. 5 shows an embodiment of a cathode ray tube wherein the electron beam is caused to rotate about its axis by an electro-mechanical means. An electrode structure generally indicated as 80 having a cylindrical portion 81 is rotatably mounted within the neck of the envelope 10. A bearing 82 in surrounding relation with the cylinder 81 is provided to allow the electrode structure to rotate therewithin. A pair of curved electrodes 84 and 86 formed integral with the cylinder 81 are energized through slip rings 88 and 89 to cause the electron beam 12 to be deflected through substantially 90°. Slip ring 88 is electrically connected to electrode 84 and slip ring 89 is electrically connected with electrode 86 and each is energized from a potential source outside the envelope 10 through individual brushes 90 and 91. Brush 90 is maintained in electrical contact with slip ring 88 thereby energizing electrode 84 and brush 91 is in electrical contact with slip ring 89 thereby energizing electrode 86. The electrode 84 is maintained at a potential negative with respect to the cathode potential and electrode 86 is maintained at substantially equal potential with respect to the phosphor coated target plate 20.

A bar magnet 94 is integrally connected to the electrode structure 80 by a rod 95. Another similar bar magnet 96 is provided outside the envelope 10 and is adapted to rotate about an axis concentric with the axis of rotation of the magnet 94. In operation, the magnet 96 is rotated by any suitable means and the magnetic field established thereby penetrates the envelope 10 and causes corresponding rotational movement to the magnet 94. Upon the rotation of magnet 94, the entire electrode assembly 80 rotates thus causing the electron beam 12 to not only be deflected through substantially 90°, but also to rotate through an angle of 360°. The means for deflecting the beam onto the target 20 is the same as hereinabove referred to and described in the description of Figures 1 and 2.

The embodiment in Fig. 6 shows a polar coordinate tube wherein the electron source is positioned so that the immergent beam of electrons initially travels substantially parallel to the target plate, electrostatically bent through 90° and finally, simultaneously bent through an additional 90° and caused to be rotated about 360°. The electron beam 12 is directed to travel intermediate a pair of electrodes 100 and 102 which are energized through a common electrical conductor 104. A "field free" region is established between the electrodes 100 and 102 for protecting or shielding the beam from any spurious fields within the tube, thereby allowing the beam to travel undeflected along a path which is co-extensive with the electrodes 100 and 102.

A curved deflection electrode 108 being insulatingly spaced from electrode 100 by an insulating strip 106 is provided to form an electrical lens in connection with the upturned terminus 110 of the electrode 102. The potential applied to electrode 102 is positive with respect to the cathode potential of the electron gun and the potential applied to the electrode 108 through conductor 112 is negative with respect to the cathode potential. By properly adjusting the potentials on these electrodes, the electron can be bent through 90°. Subsequent to the above referred to bending action, the beam enters the electrode structure described in connection with the embodiment illustrated in Fig. 5 and is bent through another 90° and simultaneously rotated through 360°. The manner the electron beam 12 is caused to be deflected on the phosphor target 20 by the deflection electrodes 34 is identical with the method described in Figs. 1 and 2.

It must be understood that the descriptions referred to above are directed to an embodiment wherein the tube is provided with an apertured target electrode and annular deflection electrodes are affixed to a transparent disc-like plate. However, a rearrangement of these elements can be accomplished without avoiding the inventive concepts described in detail in the appended claims. It may be desirable in certain applications of the tube to affix the deflection electrodes to an apertured disc and coat an optically transparent disc-like plate with a phosphor coating wherein the novel operation of the polar coordinate tube is identical to that hereinabove described. Such a modification is diagrammatically illustrated in Fig. 7.

Figure 8:
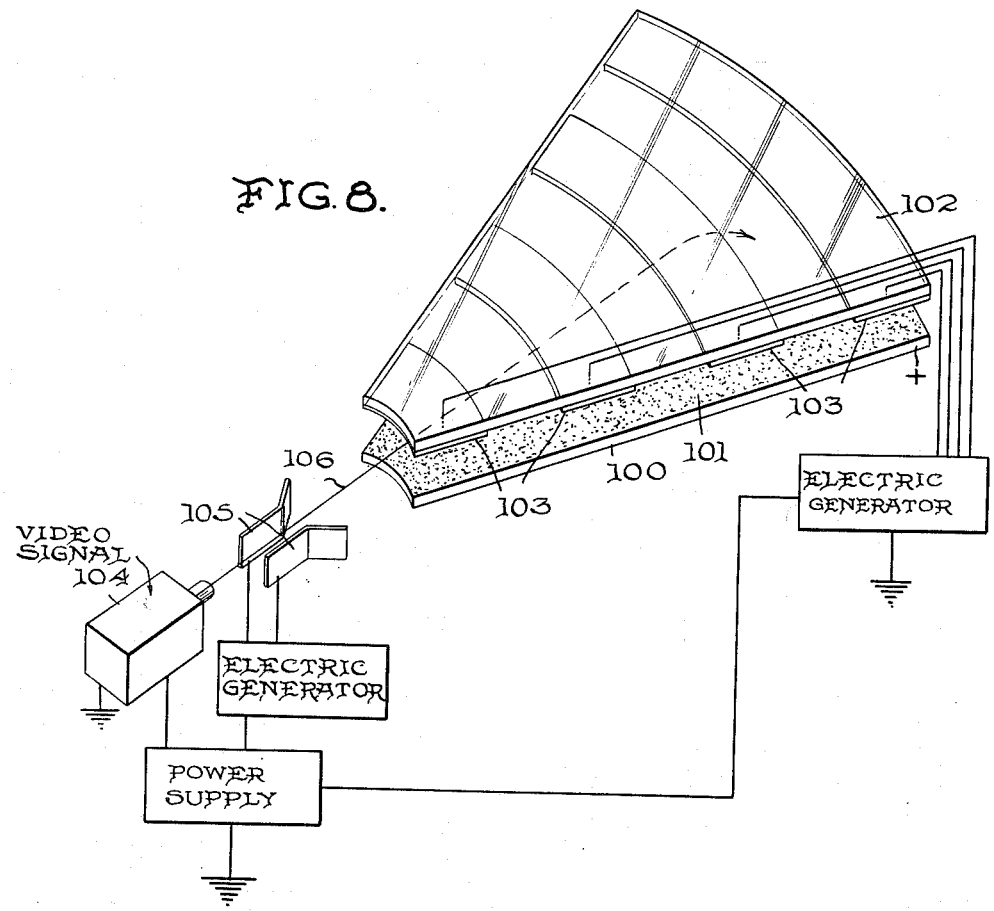
Fig. 8 is a perspective view of the components of the polar coordinate tube employing an arcuate target.

From a reading of the above description of the invention, it may be easily discerned that a device may be produced embodying the novel features of the invention, wherein the beam is caused to scan only a segment of the whole target face. Such a device is illustrated by Figure 8, wherein there is provided a target 100 in the form of an arcuate segment. One surface of the target 100 is coated with a fluorescent material layer 101. Spaced from the fluorescent coating 101 and substantially parallel therewith is an optically transparent member 102 adapted to support a plurality of arcuate deflection electrodes 103. The deflection electrodes 103 are made of an electrically conducting glass which together with the supporting member 102 comprise an optically transparent assembly between the viewer and the fluorescent coating 101 of the target 100.

An electron gun 104 provided with deflection plates 105 is adapted to direct an electron beam 106 along a path between the target 100 and the deflection electrodes 103. The beam 106 may be caused to oscillate through the angle defined by the target 100 in synchronizing with a radar antenna.

In operation, the beam 106 is caused to be deflected by a relatively negative electric field which is selectively applied to the deflection electrodes 103 by an electric generator, shown in the drawing. The relatively negative field established by the deflection electrodes 103 effectively bends the beam toward and causes it to impinge upon the fluorescent coating 101. The fluorescent material of the coating 101 is thereby excited and causes light to be emitted therefrom. Manifestly, the oscillation of the beam and the deflection effect on the beam by the deflection electrodes 103 in synchronism will effect electron impingement on all portions of the fluorescent coating 101 of the target 100.

What is claimed is:

1. A cathode ray tube comprising means for delivering a beam of electrons along a path, a planar target electrode, means for simultaneously rotating said beam; and bending said beam from said path to different paths adjacent and spaced from said target electrode, and means disposed adjacent and parallel to said target electrode for effecting deflection of said beam from said paths into registration with said target electrode.

2. A cathode ray tube as recited in claim 1 wherein said means for simultaneously rotating and bending the beam comprises a pair of rotatably mounted arcuate plates wherein one of said plates is maintained at a positive potential with respect to said beam and the other at a negative potential with respect to said beam, and means for rotating said pair of arcuate plates.

3. A cathode ray tube as recited in claim 1 wherein said means for simultaneously rotating and bending the beam comprises a pair of rotatably mounted arcuate plates wherein a positive potential with respect to said beam is impressed on one of the plates and a negative potential with respect to said beam is impressed on the other of said plates, and an electromagnetic means imparting rotation to said pair of plates.

4. An electron discharge device comprising an electron gun arrangement for forming a beam of electrons along a path, means for rotating said beam, an annular target coated with a fluorescent material being disposed perpendicular to the initial axis of said beam, electrostatic deflection means for initially bending said beam through 90°, a transparent plate disposed in spaced relation with and parallel to said target, and a plurality of transparent annular concentric electrodes affixed to said transparent plate effecting successive deflection of said beam on various radial portions of said target.

5. A cathode ray tube comprising an electron gun arrangement for forming an electron beam along a path, means for rotating said beam, a phosphor coated annular target electrode disposed normal to the axis of said beam, a bell-shaped electrode disposed in insulated relation with said target electrode being maintained at a positive potential, a transparent plate disposed in spaced relation with and parallel to said target electrode, a cycloidal conical electrode affixed to said plate with its longitudinal axis in alignment with the longitudinal axis of said bell-shaped electrode being maintained at a negative potential, and a plurality of transparent annular concentric electrodes affixed to said plate effecting successive deflection of said beam on various radial portions of said target.

6. An electron discharge device comprising an electron gun arrangement for forming a beam of electrons along a path, electrostatic means for simultaneously deflecting and rotating said beam, an annular target electrode coated with a fluorescent material disposed normal to the initial axis of said beam, a transparent disc disposed in spaced relation from and parallel to said target electrode, and a plurality of transparent concentric annular deflection plates affixed to said transparent disc on the face thereof adjacent said target electrode effecting successive deflection of said beam on various radial portions of said target electrode.

7. An electron discharge device comprising an electron gun arrangement for forming a beam of electrons along a path, a pair of parallel elongate equipotential plates disposed in alignment with said beam of electrons, means for bending said beam through 90°, means for simultaneously rotating and bending said beam through an additional 90°, an annular phosphor coated target electrode disposed parallel to the initial axis of said beam, and a plurality of transparent concentric annular circumferentially spaced deflection electrodes effecting successive deflection of said beam on said target electrode.

8. An electron discharge device comprising an electron gun structure for forming a beam of electrons along a path, a first and a second elongate equipotential electrode disposed so that said beam traverses a path intermediate said electrodes, first of said electrodes having an upturned terminal portion, a curved electrode disposed adjacent the terminal portion of said second electrode maintained at a negative potential with respect to the said first and second electrodes, means for rotating and bending said beam through 90°, an annular phosphor coated target electrode disposed parallel to the initial axis of said beam, a transparent disc disposed parallel to and spaced from said target electrode, and a plurality of transparent annular concentric circumferentially spaced electrodes affixed to the surface of said transparent disc adjacent the phosphor coated surface of said target electrode effecting successive deflection of said beam on various radial portions of said target electrode.

9. An electron discharge device comprising a substantially planar target, a deflection set disposed in spaced and substantially parallel relation with said target, means for delivering an electron beam in a direction toward the target, means for bending the beam prior to target impingement into the space between said deflection set and said target, and means for supplying energizing signals to said deflection set for deflecting said beam into impingement with corresponding portions of said target.

10. An electron discharge device comprising a substantially planar target, a deflection set disposed in spaced and substantially parallel relation with said target, means for delivering an electron beam along a path in a direction toward the target, means for deflecting the beam from said path prior to target impingement into the space between said deflection set and said target, means for selectively applying signals to said deflection set to control beam impingement with the target at different positions along one target dimension, and means for applying deflection signals to said beam at a point prior to its deflection to control beam impingement with the target at different positions along a second target dimension.

11. An electron discharge device comprising a substantially planar target, a deflection set disposed in spaced and substantially parallel relation with said target, means for delivering an electron beam along an initial path in a direction toward the target, means for deflecting the beam from said path into the space between said deflection set and said target, means for applying signals successively and repeatedly to said deflection set to control scanning of the target in a first dimension, and means for applying synchronized deflection signals to said beam along its initial path to accomplish scanning of the target in the second dimension.

12. An electron discharge device comprising a disc target, a plurality of concentric deflection electrodes disposed parallel to and spaced from said target, means for delivering an electron beam along a path in a direction toward the target, means for deflecting the beam at a point on said path into the space between said deflection set and said target, means for applying rotating forces to said beam prior to its point of deflection, and means for supplying successive energizing signals to said deflection set.

13. An electron discharge device comprising a target, means for delivering an electron beam along a path in a direction substantially perpendicular to the plane of the target, means for deflecting the beam from said path to a path which extends substantially parallel to the target, and means for deflecting the beam from the parallel portion of its path into impingement with various portions of said target.

14. An electron discharge device comprising an electron sensitive target, means for delivering an electron beam along a path in a direction toward the target, means for deflecting the beam from said path to a path which extends substantially parallel to the target, and means for deflecting the beam selectively at different positions from the parallel portion of its path into impingement with various portions of said target.

15. An electron discharge device comprising a planar target, means for delivering an electron beam along a path in a direction toward the target, means for deflecting the beam at a point on said path to a path which lies substantially parallel to the target, means for deflecting the beam from the parallel portion of its path into impingement with various portions of said target, and means for applying rotating forces to said beam prior to its point of deflection.

16. An electron space discharge device comprising an image screen, means for emitting an electron beam in a direction toward said screen, means for deflecting said beam prior to its impingement on the target along a path substantially parallel and adjacent to said screen, means operable to sweep the parallel portion of the beam through a plane parallel to said screen, and means operable to deflect said beam toward said screen successively at different intervals along the beam path.

17. A visual signal presenting arrangement comprising a cathode ray tube member having an electron sensitive screen, beam projection means for emitting a beam in a direction toward said screen, means for deflecting said beam prior to its impingement on said screen along a path adjacent to said screen, sweep means for sweeping said beam through an area adjacent and coextensive with at least a portion of said screen, and deflection means for deflecting said beam successively at different intervals along the parallel portion of the beam; means operative to energize said beam projection means, and a signal source including sweep energizing means operable to supply energizing signals to said sweep means, and means operable in synchronism with the sweep energizing means to supply signals for energizing said deflection means successively and cyclically in the provision of a raster on said screen.

18. An electron discharge device comprising a planar circular target, a plurality of circular deflection electrodes spaced from and coextensive with said circular target, and means provided to deliver a beam of electrons toward said circular target, and means provided to bend and direct said beam in the space between said circular target and said plurality of circular deflection electrodes.

19. A cathode ray tube comprising an arcuate target, a set of transparent deflection means spaced from and substantially parallel to said target, means for delivering a beam of electrons in a direction toward said target, and means for causing said beam to be directed into the space between and defined by said target and said deflection means for deflection of said beam onto said target by said deflection means.

20. An electron discharge device comprising a planar target, a deflection set disposed in spaced and substantially parallel relation with said target, means for delivering an electron beam along a first path in a direction toward the plane of said target, and means for bending the beam into the space between said deflection set and said target along a second path substantially parallel with said plane for deflection of said beam onto said target by said deflection set.

21. An electron discharge device as claimed in claim 20 wherein the means for bending the beam comprises a first semi-spherical slotted electrode maintained at a negative potential with respect to the beam, and a second semi-spherical electrode mounted concentrically with and having a smaller diameter than said first electrode maintained at a positive potential with respect to the beam.

22. An electron discharge device as claimed in claim 20 wherein the means for bending the beam comprises a first frusto-conical electrode maintained at a negative potential with respect to the beam, and a second frusto-conical smaller than and concentrically disposed with respect to said first electrode and maintained at a positive potential with respect to the beam.

References Cited in the file of this patent

UNITED STATES PATENTS

| | | |
|---|---|---|
| 1,962,873 | Parker | June 12, 1934 |
| 2,272,842 | Hickok | Feb. 10, 1942 |
| 2,449,558 | Lanier et al. | Sept. 21, 1948 |
| 2,513,742 | Pinciroli | July 4, 1950 |
| 2,518,200 | Sziklai et al. | Aug. 8, 1950 |
| 2,623,190 | Roth | Dec. 23, 1952 |
| 2,642,535 | Schroeder | June 16, 1953 |